(12) United States Patent
Schlecht

(10) Patent No.: US 7,828,041 B2
(45) Date of Patent: Nov. 9, 2010

(54) MANUALLY ACTIVATED ROLL-UP WINDOW SHADE

(75) Inventor: Werner Schlecht, Vaihingen/Enz-Aurich (DE)

(73) Assignee: BOS GmbH & Co. KG, Ostfildern (DE)

( * ) Notice: Subject to any disclaimer, the term of this patent is extended or adjusted under 35 U.S.C. 154(b) by 438 days.

(21) Appl. No.: 11/903,922

(22) Filed: Sep. 25, 2007

(65) Prior Publication Data

US 2008/0073035 A1   Mar. 27, 2008

(30) Foreign Application Priority Data

| Sep. 27, 2006 | (DE) | ................ 10 2006 046 064 |
| Sep. 27, 2006 | (DE) | ................ 10 2006 046 065 |
| Sep. 27, 2006 | (DE) | ................ 10 2006 046 069 |
| Oct. 13, 2006 | (DE) | ................ 10 2006 049 065 |
| Nov. 13, 2006 | (DE) | ................ 10 2006 053 680 |

(51) Int. Cl.
   *B60J 7/00* (2006.01)
(52) U.S. Cl. .................. 160/370.22; 160/322
(58) Field of Classification Search ............ 160/370.22, 160/322, 265; 296/219, 97.8
   See application file for complete search history.

(56) References Cited

U.S. PATENT DOCUMENTS

| 1,828,623 | A | * | 10/1931 | Sacerdote ................ 160/277 |
| 3,180,401 | A | * | 4/1965 | Gambon et al. ............ 160/265 |
| 4,252,172 | A | * | 2/1981 | Pommat et al. ............ 160/322 |
| 4,494,707 | A | * | 1/1985 | Niibori et al. ............ 242/390.2 |
| 4,690,194 | A | * | 9/1987 | Seuster ................ 160/265 |
| 4,923,244 | A | * | 5/1990 | Clenet ................ 296/214 |
| 6,161,893 | A | * | 12/2000 | Ewing et al. ............ 296/152 |
| 6,682,133 | B2 | * | 1/2004 | Glasl ................ 296/216.01 |
| 6,899,380 | B2 | * | 5/2005 | Kralik et al. ............ 296/214 |
| 2007/0215299 | A1 | | 9/2007 | Eiselt |

FOREIGN PATENT DOCUMENTS

| DE | 19834777 A1 | 2/2000 |
| DE | 20309690 U1 | 9/2003 |
| DE | 10300426 A1 | 9/2004 |
| DE | 10324545 A1 | 1/2005 |
| DE | 102004038756 A1 | 2/2006 |
| DE | 102004036392 A1 | 3/2006 |
| DE | 102004046783 A1 | 6/2006 |

\* cited by examiner

*Primary Examiner*—David Purol
(74) *Attorney, Agent, or Firm*—Leydig, Voit & Mayer, Ltd.

(57) ABSTRACT

A roll-up sunroof shade is provided that has two guide rails in addition to the tensioned shade element. A push element runs in each guide rail. Each push element is driven with a positive fit via a separate drive gear. For manual activation of the shade element, the rotational movement of the wind-up shade is transferred to the drive gears, and thus to the push elements, via a gear arrangement. In contrast, during retraction, the force acts from the push elements onto the wind-up shaft via the drive gears in order to generate the necessary rotational movement of the wind-up shaft.

19 Claims, 5 Drawing Sheets

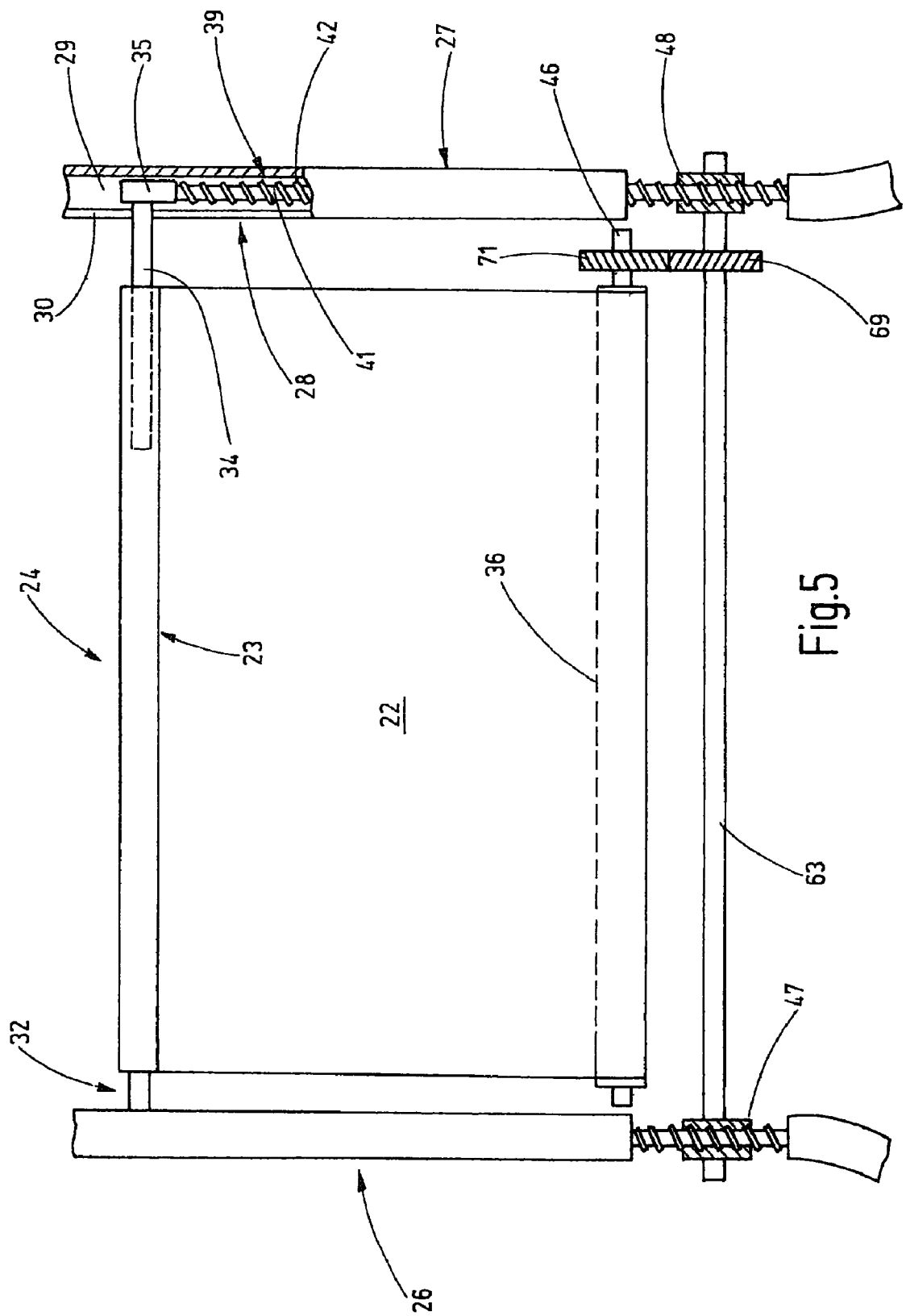

MANUALLY ACTIVATED ROLL-UP WINDOW SHADE

FIELD OF THE INVENTION

The present invention relates to window shades for motor vehicles.

BACKGROUND OF THE INVENTION

As a rule, manually actuated roll-up window shades are somewhat simpler in construction than electrically operated roll-up window shades. For example, electrically operated roll-up window shades require a drive motor, which increases costs. If a roll-up window shade is located in the effective arms reach of the driver, a manually activated roll-up window shade can be used easily. A preferred type of roll-up window shades that can be actuated manually is a roll-up sunroof shade. Roll-up sunroof shades are generally designed such that they can remain in any arbitrary intermediate position.

The use of a wind-up shaft that is biased in a wind-up direction of the shade element with the help of a spring motor is the simplest form of such a roll-up shade. The edge of the shade element away from the wind-up shaft is connected to a pull rod that is guided in side guide rails and can be operated by hand. Braking devices on the pull rod help ensure that the pull rod remains in each desired position and is not moved in the direction of the wind-up shaft by the spring motor. For this purpose, the braking power must be relatively strong because the spring motor provides a relatively strong retraction force when it is at the end of its activation path, (i.e. the shade is completely extended) even when a spring motor having a flat characteristic line is used.

Moreover, with such an arrangement, the tensile stress in the shade element differs very widely depending on whether the shade is pulled out or largely retracted. Another disadvantage of such an arrangement is that the activation force that must be applied on the shade element is significantly greater when the shade is being extended than when being retracted because of the braking devices and the retracting force applied by the spring motor.

To obtain a more constant activation force, a cord can be attached to each end of the pull rod so that it extends from the pull rod to the distal end of the guide rail out of view of the wind-up shaft as shown in DE 10 2004 038 756 A1. At the distal end of the guide rail the tension cord turns around and extends back to the wind-up shaft. A pulley, on which the cable is wound, is arranged coaxial to the wind-up shaft for each tension cable. A spring compensating device is provided between the pulley and the wind-up shaft. The spring compensating device is necessary to compensate for the difference in length produced when the shade element is unwound from the wind-up shaft while on the other side the tension cord is wound onto the pulley with constant effective radius. This arrangement has proven to work rather well, but the tension cord is not easy to mount.

OBJECTS AND SUMMARY OF THE INVENTION

In view of the foregoing, a general object of the present invention is to provide a manually activated roll-up window shade for motor vehicles that has a relatively low production cost.

The manually activated roll-up window shade of the present invention includes a rotatably mounted wind-up shaft. One edge of a shade element is fixed to the wind-up shaft. The other edge of the shade element is connected to a pull rod. The ends of the pull rod are guided in two guide rails. The guide rails extend on both sides of the tensioned shade element.

To keep the shade element in tension, two push elements are provided, each of which one is allocated to one of the guide rails. The push elements are guided into the guide rails and both carry teeth. The push elements push on the pull rod. The pull rod is comprises a non-continuous actuation element, in that it has two ends not connected to each other.

The roll-up window shade of the present invention further comprises two drive gears, of which one is allocated to one push element and the other is allocated to the other push element. The drive gears are located in the ends of the wind-up shaft. The push elements act kinematically between the drive gears and the pull rod.

Another mechanical arrangement can be provided to maintain the web tension. For this purpose, in principle, there are two possible arrangements. First, the additional mechanical arrangement can be formed by a spring mechanism or by a kind of gear. In one embodiment, the spring mechanism acts between the wind-up shaft and each of the two drive gears. This is an especially space-saving arrangement and is also structurally relatively simple. To this end, the pull rod can be anchored at each end to account for inappropriate handling.

In the other possible arrangement, another connection shaft extending parallel to the wind-up shaft is provided. The gears sit on this connection shaft. The gears can also be coupled in a torsionally elastic way with the connection shaft. A side of the connection shaft, in turn, is connected to the wind-up shaft via a gear.

With respect to possible jamming, the relationships become better if the two gears are locked in rotation with the connection shaft, because the movements at both ends of the pull rod are then positively transferred to the other end via the push elements coupled with each other rigidly. This situation applies for retraction of the shade. For extension of the shade, the relationships are less critical because positive synchronization between the ends of the pull rod is sufficiently ensured via the shade element.

If an additional shaft on which the drive gears are locked in rotation, is used a spring mechanism can be eliminated. In such a case, a corresponding gear is sufficient, which transfers or reverses the rotational movement of the wind-up shaft to the connection shaft.

Using a cable gear provides certain advantages. The cable gear can make it relatively simple to compensate for the changing winding diameter of the roll body formed by the shade element on the wind-up shaft. Because the diameter of the gears remains constant, the shifted length of the push element would remain constant without the compensating cable gear, while the unwound amount of shade element decreases with decreasing roll-body diameter. The cable gear can comprise a cylindrical pulley and a worm. The worm defines guide grooves for a truncated cone-shaped pulley that ensure an ordered placement of the cable on the extent of the cone.

The push elements preferably have a round cross section. For example, the push elements can have a cylindrical core with a spiral attached on the outside.

The guide rails preferably include undercut guide grooves. The guide grooves are formed from a groove chamber and a groove slot having an open width that is smaller than the diameter of the groove chamber. This ensures that the push elements are guided in the groove chamber without buckling.

The following description of the figures and illustrative embodiments is limited to explaining the aspects that are essential for understanding the invention. It will be apparent to those skilled in the art that a series of modifications are possible. Smaller details that are not described can be inferred from the drawings by someone skilled in the art.

The following drawings are not necessarily to scale. For illustrating the essential details, certain areas may be enlarged.

Other objects and advantages of the invention will become apparent upon reading the following detailed description and upon reference to the drawings, in which:

BRIEF DESCRIPTION OF THE DRAWINGS

FIG. 5 is a schematic perspective view of a drive arrangement for the roll-up shade of FIG. 1 that is similar to that of FIG. 2 and uses a spur-wheel gear for coupling the wind-up shaft with the connection shaft.

Figure 1:
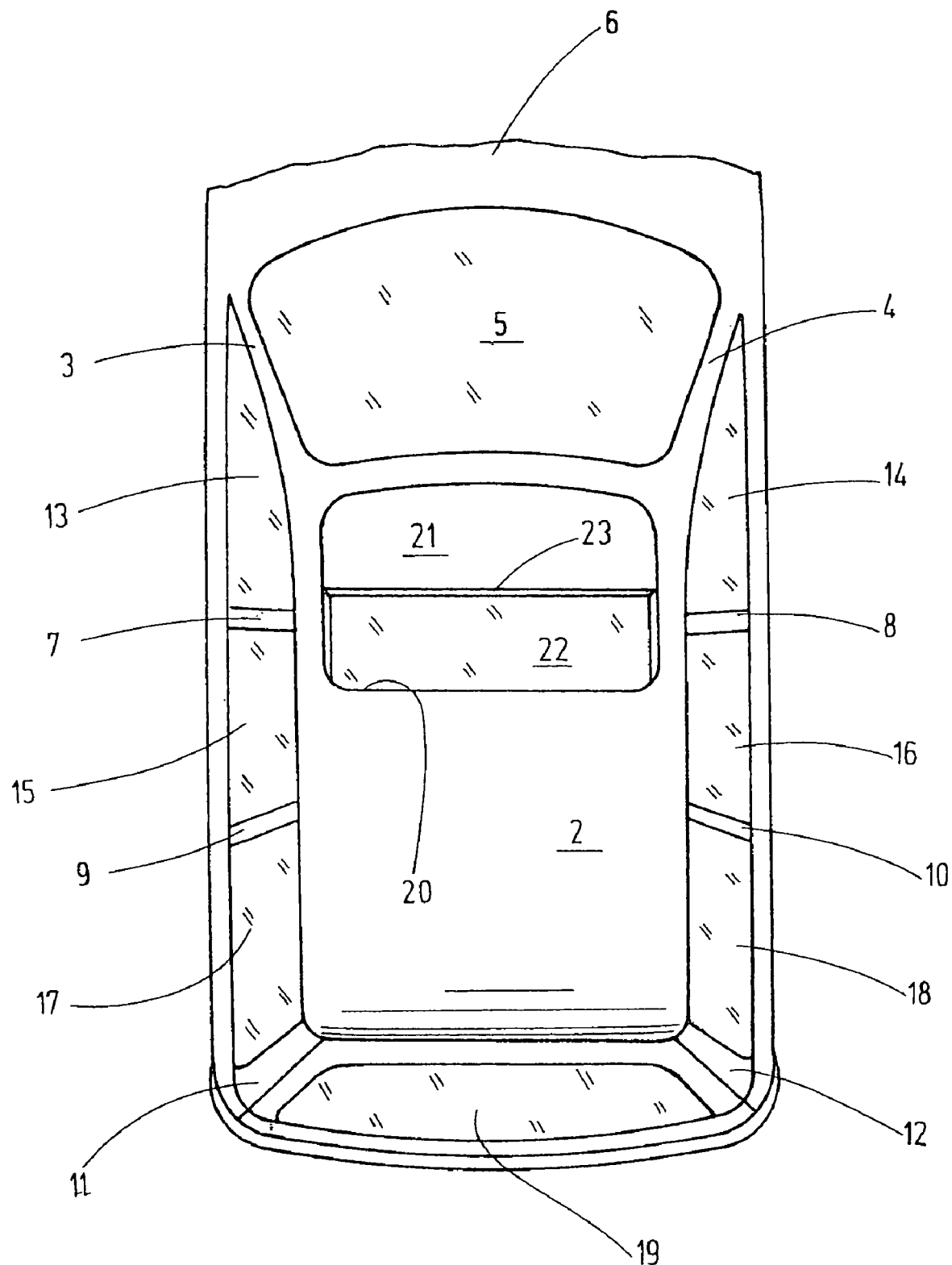
FIG. 1 is a top view of an illustrative passenger car having a sunroof with a roll-up shade according to the present invention.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DESCRIPTION OF THE PREFERRED EMBODIMENTS

Referring to FIG. 1 of the drawings, a passenger car, in particular a station wagon 1, is shown. Two A-pillars 3 and 4 project from the front edge of the roof of the car 1. A windshield 5 is arranged between the two A-pillars 3 and 4. The windshield 5 transitions into a hood 6 at its bottom edge. Rearwards of the two A-pillars 3 are B-pillars 7 and 8, C-pillars 9 and 10, and also D-pillars 11 and 12. Front side windows 13, 14, rear side windows 15, 16, and side windows for the trunk space 17, 18 are provided between the pillars 3-12. A rear window 19 which is arranged between the two D-pillars 11, 12 is provided at the end of the car. A roof opening 20 is provided in the front area of the roof 2. A sunroof 21 that borders the front windshield 5 is arranged in the roof opening 20. The sunroof 21 can be a sliding roof or a lifting roof and can incorporate a glass roof that connects both functions to each other.

Figure 2:
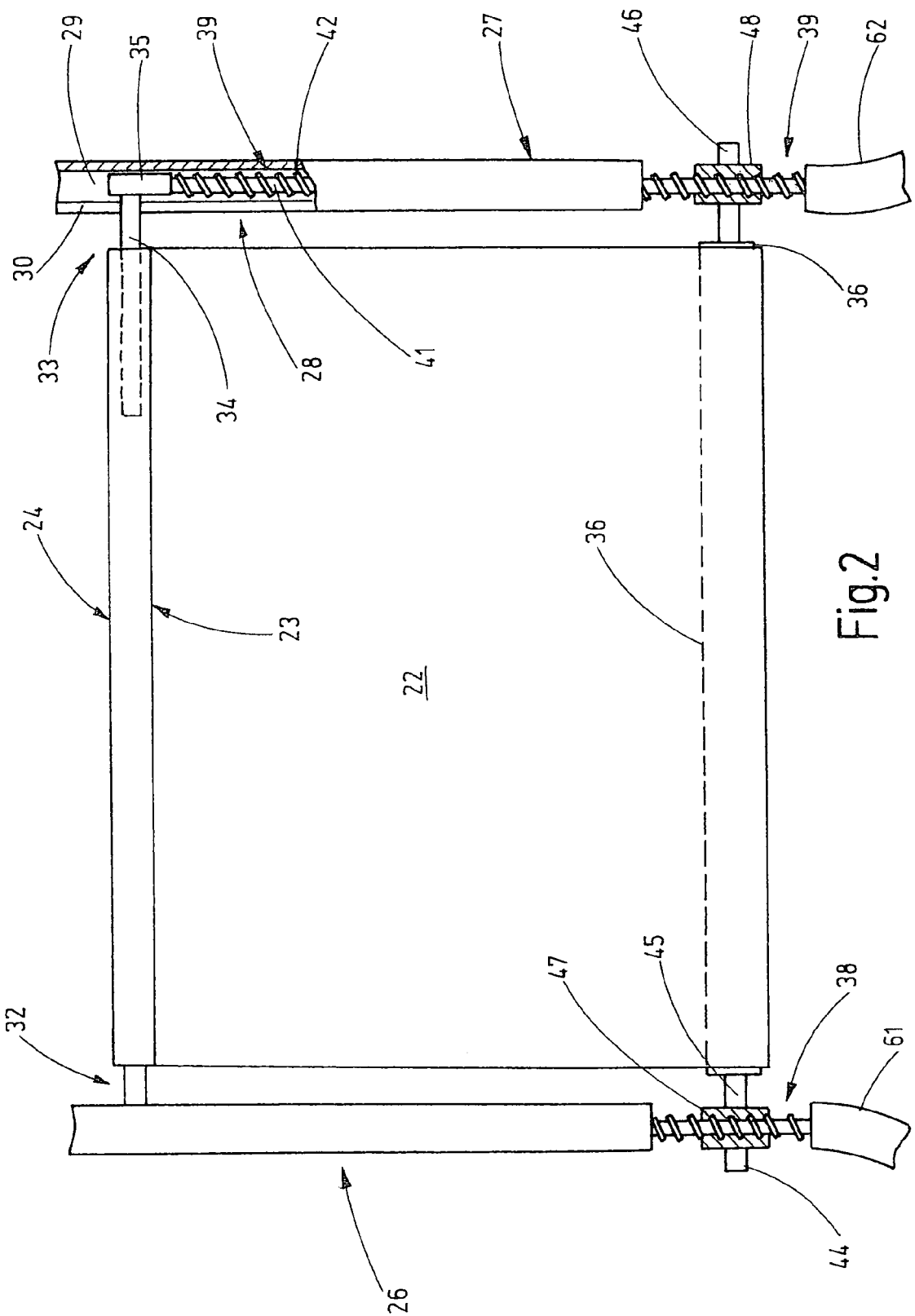
FIG. 2 is a schematic plan view of the drive arrangement of the roll-up sunroof shade of FIG. 1.

A partially extended shade element 22 is arranged underneath the glass roof 21. The shade element 22 is fixed to a pull-out element or pull rod 23. The shade element 22 and the pull rod 23 are components of a manually activated roll-up window shade 24. The basic construction of the roll-up window shade 24 is shown in FIG. 2. The roll-up window shade 24 includes two guide rails 26 and 27 that extend at the sides of the sunroof. The guide rails 26 and 27 are arranged in a mirror-symmetric manner to each other and follow the profile of the side edge of the sunroof.

As the two guide rails 26 and 27 are identical to each other, the inner structure of only the guide rail 27 will be described. The description applies analogously to the guide rail 26. In the guide rail 27 there is an undercut guide groove 28 having a profile composed of a groove chamber 29 and a groove slot 30. The width of the slot 30 is smaller than the open width of the groove chamber 29, which produces the undercut structure.

The two guide rails 26 and 27 guide the pull rod 23 to which an edge of the shade element 22 is attached. The pull rod 23 includes a middle piece in which two end pieces 32 and 33 are guided in a telescoping manner. The middle piece is arranged, for example, in a hose-shaped loop formed on the shade element 22. The end of the shade element 22 opposite the pull rod 23 is fixed to a wind-up shaft 36.

Each of the two end pieces 32 and 33 includes a telescoping rod 34 that has a sliding piece 35 arranged on its free end. The telescoping rod 34 has a cross-sectional size and shape that allows it to pass through the slot 29 with certain amount of play. In contrast, the sliding piece 35 has a cross-sectional size and shape that is adapted to the cross-sectional size and shape of the groove chamber 29, which has, for example, a circular cross section.

A drive device is provided to move the shade element 22 from an extended position in which it is spread in front of the sunroof 21 into a retracted position. The drive device includes two identical linear bending elastic push elements 38 and 39. Each of the push elements 38, 39 includes a core 41 with a circular cross section and a spiral 42 fixed to the outside of the circular core 41. This results in a kind of bending elastic rack having teeth all around. The outer diameter of the push elements 38, 39 corresponds to the open width of the groove chamber 29. In the groove chamber 29, the two push elements 38, 39 are guided in their associated guide rails 25, 27 in a buckle-free manner and can transfer compressive forces. Its diameter is greater than that corresponding to the slot width, so that they cannot buckle to the side through the slot 30 even for compressive loading.

Two axle journals 45, 46 project from the ends of the wind-up shaft 36. The axle journals 45, 46 are locked in rotation with the wind-up shaft 36. They are used, among other things, for storing the wind-up shaft in the roof of the vehicle. Spur gears 47 and 48 sit on the axle journals 45, 46 respectively. The spur gears 47, 48 have teeth on their outer peripheral surface that allow a positive-lock engagement with the associated push element 38, 39. The two push elements 38, 39 are pressed in the radial direction against the associated drive gear 47, 48, so as to provide a continuous engagement. The push elements 38, 39 lie on the same side relative to the rotational axis on the associated drive gear 47, 48 from which the shade element 22 extends away from the wind-up shaft 36.

Figure 3:
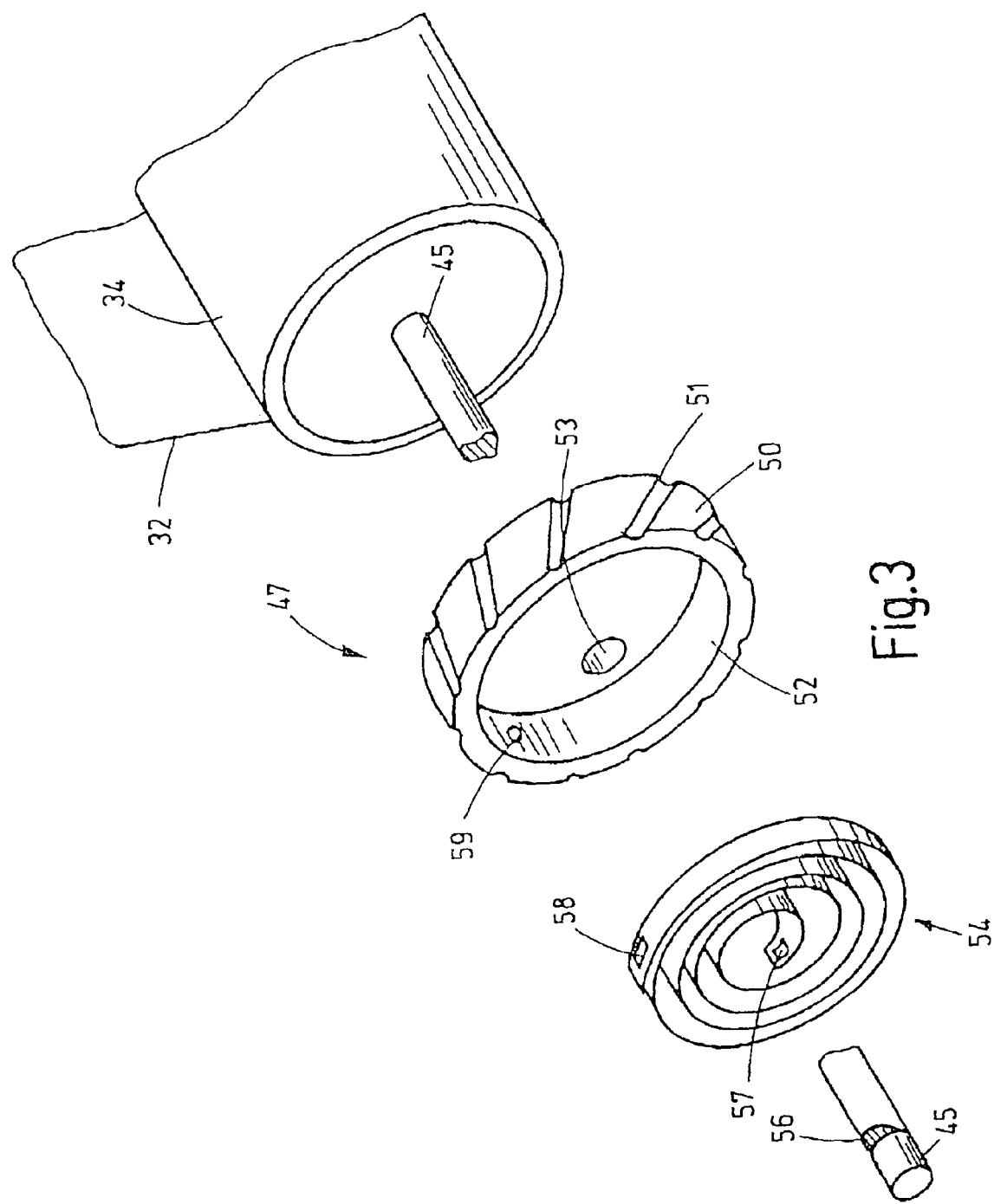
FIG. 3 is a schematic perspective view of the connection between one of the drive gears and the wind-up shaft.

The gear 47 is rotatably supported on the axle journal 45 and the gear 48 is rotatably supported on the axle journal 46. The kinematic or operating connection, by means of which a drive moment is transferred, is illustrated in detail in FIG. 3. The following description applies to both drive gears 47 and 48. The drive gear 47 has a disk-like shape with a cylindrical outer peripheral surface 50 in which grooves 51 running diagonally are formed as teeth that which hold the associated section of the spiral 42. The gear 47 contains a cavity 52 in which a bearing borehole 53 is contained concentrically with which the gear 47 is supported so that it can rotate on the axle journal 45/46, coaxial to the outer peripheral surface 50. A spring housing for a spiral spring 54 that creates a rotationally elastic connection between the axle journal 45/46 and the gear 47/48 forms the cavities 52. For this purpose, the axle journal 45/46 is provided at the corresponding position with a tab 56 stacked on top that is used as a stop for an opening 57 provided in the inner spring end. The outer spring end also contains an opening 58 that can be connected with a positive fit to a tab 59 that points radially inward from the outer peripheral surface of the cavity 52.

As will be appreciated from the functional description below, for corresponding dimensioning of the effective diameter of the gear 47/48 relative to the roll body that forms the wound shade element 22 on the wind-up shaft 36, rotation relative to the wind-up shaft 36 takes place. The measure of this relative rotation equals, a maximum of approximately one complete rotation. Therefore, a spiral spring 54 can be used that has a relatively short effective path.

The figures are not to scale. Rather, the figures are intended to explain the important features of the drive concept according to the invention. The appropriate dimensions for the guide rails 26 and 27 and also the resulting outer diameter of the two bending-elastic push elements 38, 39 are known from practice.

For the sake of completeness, it should be mentioned that a bending-elastic storage tube 61 or 62, which is arranged essentially freely in the vehicle according to the spatial relationships, is located on the opposite side of the relevant gear 47, 48 out of view of the corresponding guide rail 26, 27. The measures that are taken to hold the storage tubes 61 and 62 stationary are not important for understanding the invention. Moreover, a housing that surrounds the gear 47 or 48 and which contains a corresponding tangential borehole for passing the associated bending-elastic push element 38, 39 can optionally be provided.

The following is a description of the operation of the illustrated embodiment. In this case, it is assumed that initially the shade element 22 is wound completely (i.e., as much as possible) onto the wind-up shaft 36. In the wound state, the spiral springs 54 contained in the two gears 47, 48 are slightly biased. Because of the biasing, the engaged and thus positively coupled push elements 38 and 39 are biased elastically in the direction towards the two sliding pieces 35 of the pull rod 23 and form a contact there. The biasing force of the spiral springs 54 holds the shade element 22 in tension between the wind-up shaft 36 and the pull rod 23.

Starting from the completely retracted position in which the pull rod 23 is next to the relevant side edge 20 of the sunroof 21, if a user wants to extend the roll-up sunroof shade 24, he grips the pull rod 23 by hand. The user then pulls the pull rod 23 in the direction towards the front edge of the roof to a desired shading position. By pulling back the pull rod 23, the wind-up shaft 36 is set into rotation in a pull back direction of the shade element 22. Simultaneously, the drive gears 47 and 48 coupled via the spiral springs 54 also run in the same direction. The drive gears 47 and 48 push the push elements 38, 39 into the guide rails 26, 27 accordingly.

Because the roll-body diameter on the wind-up shaft 36 decreases continuously, the quantity of shade element 22 pulled out for each rotation becomes smaller than the length of the push element 38, 39 that is fed for each rotation of the coupled drive gear 47, 48. The spiral springs 54 also perform the task of compensating this path difference. From the description it can be appreciated that these spiral springs 54 are further wound with increasing extended travel of the shade element 22.

For retracting the shade, the user presses the pull rod 23 by hand in the direction towards the wind-up shaft 36. In this case, the sliding pieces 35 push the push elements 38, 39 back in the direction of the storage tubes 61 and 62, respectively. In this way, the push elements 38, 39 are moved back by the force applied by hand and set the drive gears 47, 48 coupled positively to them in the corresponding direction. This movement is transferred via the spiral springs 54 and the axle journals 45 and 46 to the wind-up shaft 36, which winds up the shade element 22 accordingly.

As can be appreciated, the force to be applied by the user must overcome the friction of the push elements 38, 39 in the guide rails 26, 27 or the storage tubes 61, 62. The force that is necessary for winding the spiral springs 54 according to the winding difference between the wind-up shaft 36 and the drive gear 47/48 must also be overcome. This winding force is significantly smaller than the friction force of the push elements 38, 39 in their guide rails or storage tubes. The pull rod 23 can be stopped at any arbitrary position.

Figure 4:
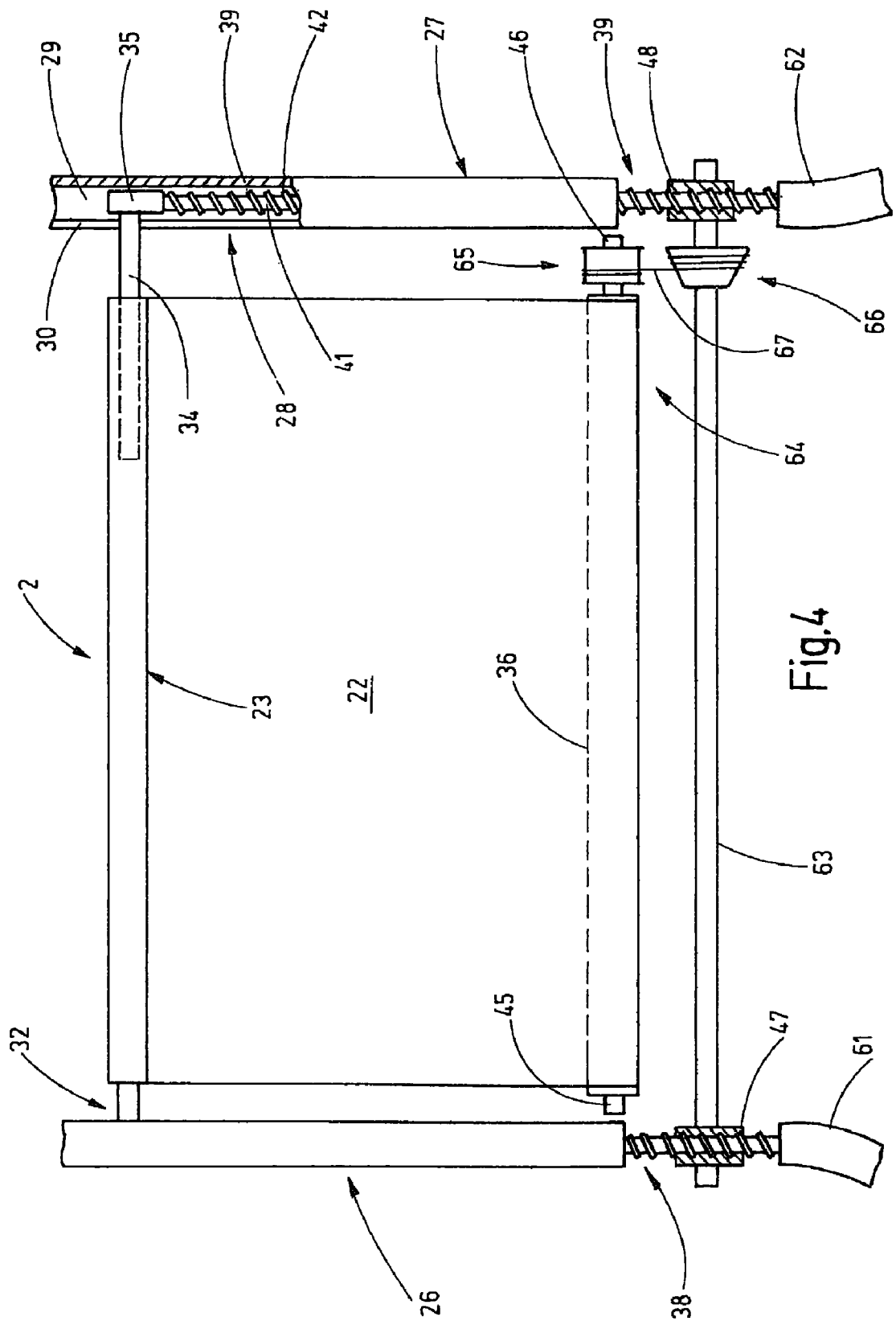
FIG. 4 is a schematic perspective view of a drive arrangement for the roll-up shade of FIG. 1 in which the drive gears are connected directly to the push elements and the connection shaft is coupled with the wind-up shaft via a cable gear.

FIG. 4 shows an arrangement that operates without additional spring mechanisms. For this purpose, the two drive gears 47 and 48 sit on a connection shaft 63 arranged next to and parallel to the wind-up shaft 36. The two drive gears 47 and 48 are locked in rotation with the connection shaft 63. The construction and the connection between the drive gears 47 and 48 on one side and the push elements 38, 39 on the other side are as described in connection with FIGS. 1-3.

To transfer the rotational movement of the drive gears 47 and 48 to the wind-up shaft 36 while retracting the shade, a cable gear 64 is provided. The cable gear 64 includes a cylindrical pulley 65 that is locked in rotation on the axle journal 46 of the wind-up shaft 36. The connection shaft 63 carries, in a rotationally locked way, a cable worm 66 belonging to the cable gear 64. The cable worm 66 involves a pulley with a spherical or conical outer peripheral surface that optionally contains cable grooves in order to force proper placement of a cable 67 that extends between the pulley 35 and the cable worm 66.

One end of the cable 67 is anchored to the cylindrical pulley 65 and with the other end is connected to the cable worm 66. The section of the cable 67 connecting the pulley 65 and the cable worm 66 lies on the same side of the wind-up shaft 36 as the outlet of the shade element 22 from the wind-up shaft 36.

The precise dimensions of the cable gear 64 can be appreciated from the following description of the function. It shall be assumed that the pull rod 23, corresponding to the opened shade 24, is located next to the back edge of the sunroof 21. In this state, the outlet of the connecting cable section lies in the vicinity of the end of the cable worm 66 that has the smaller diameter. The cable 67 is tensioned, which also creates the necessary web tension in the shade element 22, so as to prevent slack and ensure that the sliding pieces 35 contact the push elements 38, 39.

If the user grips the front edge of the shade element 22 by hand with the pull rod 23 and moves it forwards, the shade element 22 is pulled out accordingly from the wind-up shaft 36, which is set in rotation. The rotational movement of the wind-up shaft 36 winds the cable 67 onto the cylindrical pulley 65 and unwinds the cable from the cable worm 66. In this way, the diameter of the roll body decreases such that the rotational angle of the wind-up shaft 36 increases for each unit of length of the path, the closer the pull rod 23 approaches full extension. Accordingly, the translation ratio between the pulley 65 and the pulley 66 must change so that more length of the push element 38, 39 is advanced accordingly, when the pull rod approaches the position of full extension. To this end, the release point of the cable 67 on the cable worm 66 runs from the end with the smaller diameter in the direction to the end with the greater diameter. In this way, the gear 48 is increasingly retarded relative to the wind-up shaft 36. Therefore, the ends of the two push elements 39 contacting the pull rod 23 run at the same speed as the pull rod 23. The positive contact between the stump ends of the push elements 38, 39 and the sliding pieces 35 remains. Possible residual errors are compensated by the elasticity of the web 22. The residual errors, however, are very small.

FIG. 5 shows an alternative embodiment that is similar to the embodiment of FIG. 4. In the embodiment of FIG. 5, the two gears 47 and 48 are, in turn, locked in rotation on the connection shaft 63. The geared coupling between the connection shaft 63 and the wind-up shaft 36 is achieved with the help of two spur gears 69 and 71. The spur gear 71 sits, for example, locked in rotation on the axle journal 46, while the gear 69 is coupled with the connection shaft 63 via a spiral spring. The spiral spring and the gear 69 can have the construction described in connection with FIG. 3. The necessary rotational speed/path difference is permitted, as in the embodiment according to FIG. 2, by the spiral spring 54. However, in the embodiment of FIG. 5, both gears 47 and 48 necessarily rotate in sync so that the risk of sharp pulling and twisting of the pull rod 23 is prevented, even if the user grips the front edge of the shade element 22 asymmetrically in order to activate the shade 24.

A roll-up sunroof shade having two guide rails in addition to the tensioned shade element is provided. A push element runs in each guide rail. Each push element is driven with a positive fit via a separate drive gear. For manually operating the shade element, the rotational movement of the wind-up shaft is transferred via a geared arrangement to the drive gears and thus to the push elements. When retracting, the force acts in the opposite direction from the push elements via the drive gears to the wind-up shaft in order to generate the necessary rotational movement of the wind-up shaft.

The invention claimed is:

1. A manually actuatable roll-up window shade for a motor vehicle comprising:
   a rotatably supported wind-up shaft having first and second ends;
   a shade element having a first edge fixed to the wind-up shaft;
   a pull rod connected to a second end of the shade element remote from the wind-up shaft;
   two guide rails for guiding the pull rod that extend on opposite sides of the shade element when the shade element is in an extended position;
   two elongated push elements each of which is guided by a respective one of the guide rails, said elongated push elements each having discrete opposite ends with one of said ends interacting with the pull rod and a second end remote from the pull rod;
   two drive gears arranged adjacent the first and second ends of the wind-up shaft, said elongated push elements each extending in tangential relation to a respective one of said gears,
   said push elements and gears having positively interengaging outer peripheries such that movement of said elongated push elements rotates said gears,
   said drive gears each being coupled to the wind-up shaft via a separate spring tensioning mechanism,
   said push elements each having a respective storage tube for receiving and holding a section of the push element adjacent the second end when the window shade is in a retracted position;
   said pull rod being manually movable between a shade retracted position adjacent said wind-up shaft and a shade extended position remote from the wind-up shaft,
   said manual movement of said pull rod to said extended position being operable for rotating said wind-up shaft, which in turn is operable via the spring tensioning mechanism for rotating the drive gears and moving the push elements to extended positions, said manual movement of said pull rod from said extended position to said retracted position being operable for forcing the push elements toward a retracted position and in turn rotating said drive gears and wind-up shaft in an opposite direction via said spring tensioning mechanism, said manual movement of said pull rod being effective for overcoming frictional resistance of the push elements in the guide rails and storage tubes together with any resistance biasing force of the spring tensioning mechanisms, and said frictional resistant forces of said push elements in said guide rails and storage tubes being greater than the resistance biasing force of the spring tensioning mechanisms such that the pull rod may be stopped and retained by the frictional resistance forces at any location between the extended and retracted positions.

2. The window shade according to claim 1, wherein each drive gear is directly coupled with the wind-up shaft via the spring tensioning mechanism.

3. The window shade according to claim 2, wherein each spring mechanism comprises a spiral spring.

4. The window shade according to claim 1, wherein the two drive gears sit on a connection shaft separate from the wind-up shaft.

5. The window shade according to claim 4, wherein the spring tensioning mechanism includes gear elements that operatively connect the connection shaft to the wind-up shaft.

6. The window shade according to claim 5, wherein each drive gear is coupled with the connection shaft via a spring element.

7. The window shade according to claim 5, wherein the drive gears sit locked in rotation on the connection shaft.

8. The window shade according to claim 5, wherein the gear elements comprise two gears that are engaged with each other, one gear being coupled with the wind-up shaft and the gear being coupled with the connection shaft.

9. The window shade according to claim 1, wherein the pull rod is configured so such that its length is selectively adjustable.

10. The window shade according to claim 1, wherein a first end of each of the guide rails is in the vicinity of the wind-up shaft.

11. The window shade according to claim 1, wherein the guide rails extend parallel to each other.

12. The window shade according to claim 1, wherein each guide rail includes a guide groove.

13. The window shade according to claim 12, wherein the cross-sectional configuration of the guide groove includes a groove chamber and a groove slot, wherein a diameter of the groove chamber is greater than an open width of the slot such that an undercut guide groove is produced.

14. The window shade according to claim 13, wherein each push element is guided in a buckle free manner in the respective groove chamber.

15. The window shade according to claim 1, wherein each push element has teeth all around.

16. The window shade according to claim 1, wherein each drive gear is a spur gear.

17. The window shade according to claim 1, wherein a separate gear housing is provided for each drive gear.

18. The window shade according to claim 1, wherein each storage tube comprises a flexible material.

19. The window shade according to claim 1 in which said drive gears are mounted on said winding up, and said tension spring mechanism includes a spring disposed within a central cavity of each respective drive gear.

* * * * *